Patented June 6, 1939

2,160,934

UNITED STATES PATENT OFFICE 2,160,934

POLYMERIZATION OF VINYLIDENE CHLORIDE

Ralph M. Wiley, Midland, Mich., assignor to The Dow Chemical Company, Midland, Mich., a corporation of Michigan No Drawing. Application September 16, 1937, Serial No. 164,127

7 Claims. (Cl. 260—80)

This invention relates to the polymerization of vinylidene halides, i. e., vinylidene chloride, bromide, and chlorobromide, and particularly to an improved catalyst therefor.

The polymers of vinylidene halides and copolymers thereof with other polymerizable materials are valuable substances which can be employed in the preparation of molded articles, films, filaments, and the like. These compounds, however, polymerize very slowly in the presence of light, air, and/or many of the catalysts heretofore proposed for the polymerization of other unsaturated compounds. It is necessary, therefore, to provide a process whereby vinylidene halides can be caused to polymerize rapidly either alone or in the presence of a material co-polymerizable therewith, in order that the polymeric product may be obtained on a commercial basis.

Certain materials, which are herein designated as "peroxides", accelerate slightly the polymerization rate of monomeric vinylidene halides and of mixtures thereof with other polymerizable compounds. Such peroxides include ozone, organic peroxides such as benzoyl peroxide, acetyl peroxide, acetyl benzoyl peroxide, and the like, and inorganic peroxides such as hydrogen peroxide, barium peroxide, etc., and their reaction products with acids. In order to secure the accelerating effect of such agents, however, it is necessary to use relatively elevated temperatures of polymerization, especially in the production of co-polymeric bodies. The use of elevated polymerizing temperatures results in products which have a low viscosity and low tensile strength as compared with similar polymers obtained through the use of lower polymerizing temperatures.

Certain metal carbonyls, especially those of iron, nickel, and cobalt, have been employed as catalysts for the polymerization of unsaturated compounds, such as, for example, drying oils, etc. The metal carbonyls, however, are either inhibitors for the polymerization of monomeric vinylidene halides and mixtures thereof with other polymerizable materials, or they have no particular accelerating influence on the rate of polymerization of such materials. In fact, the metal carbonyls are such effective inhibitors of the polymerization of vinylidene chloride that this material in monomeric form can be stored indefinitely without any traces of polymerization becoming apparent when a metal carbonyl is present.

I have now found, however, that the combination of an oxygenating agent with a metal carbonyl constitutes an active catalyst for accelerating the polymerization rate of vinylidene halides and mixtures thereof with other polymerizable materials at room temperatures, and that the polymeric product obtained by the use of such composite catalyst has a high tensile strength and is satisfactory for employment where this property is desired.

All of the metals of Group VIII of the periodic system as well as copper, silver, and gold from Group I, and mercury from Group II form carbonyls. The carbonyls of these metals are effective polymerization catalysts for vinylidene halides when mixed with a peroxide.

In general I employ between about 5 and about 90 parts by weight of the metal carbonyl, preferably between about 20 and about 40 parts by weight of such material, for each 95 to 5 parts by weight of peroxide, preferably between about 80 and about 60 parts of such agent. The amount of catalyst employed is ordinarily between about 0.1 and about 5 per cent of the weight of monomeric material to be polymerized.

In the following table are recorded the results of a series of experimental runs in which a vinylidene halide, or a mixture thereof with another polymerizable material, was treated with a peroxide, a metal carbonyl, or a mixture of the two, to determine the relative catalytic rates of such materials. In each instance, 100 grams of the monomeric substance was employed, and the weight of the catalyst was 0.5 gram of each component of the catalyst mixture. Polymerization was not carried to completion, but was only continued for the time indicated in the table, at which point it was possible to estimate the relative effectiveness of the catalysts employed. For sake of convenience, the following abbreviations will be employed in the table: $AcBzO_2$=acetyl benzoyl peroxide, $BzO_2$=benzoyl peroxide, $Ni(CO)_4$=nickel carbonyl, $Co(CO)_4$=cobalt carbonyl, and $Fe(CO)_5$=iron carbonyl.

| Polymerizable material | Catalyst | Time, hours | Yield, grams |
|---|---|---|---|
| Vinylidene chloride | None | 24 | 2.0 |
| Do | $BzO_2$ | 24 | 2.7 |
| Do | $Ni(CO)_4$ | 24 | None |
| Do | $Fe(CO)_5$ | 24 | None |
| Do | $Co(CO)_4$ | 24 | None |
| Do | $Ni(CO)_4+BzO_2$ | 48 | 38.5 |
| Do | $AcBzO_2+Ni(CO)_4$ | 48 | 15.0 |
| Do | $AcBzO_2$ | 48 | 3.0 |
| Vinylidene chloride 73, vinyl chloride 27. | $BzO_2$ | 40 | None |
| Do | $BzO_2+Ni(CO)_4$ | 40 | 11 |
| Vinylidene chloride 73, vinyl acetate 27. | $BzO_2+Ni(CO)_4$ | 40 | 14.0 |
| Vinylidene chloride 92, styrene 8. | $BzO_2+Ni(CO)_4$ | 180 | 15 |
| Do | $BzO_2$ | 180 | None |

In each instance it is observed that a composite catalyst comprising a peroxide and a metal carbonyl is effective, while the individual components of the mixture when employed alone cause substantially no polymerization, and in fact apparently act as inhibitors of polymerization.

Polymeric derivatives of vinylidene chloride which have been prepared through the use of a catalyst comprising a metal carbonyl, and especially those in which iron carbonyl was employed, should be treated after polymerization suitably with a dilute mineral acid or other agent capable of removing from the polymer remaining traces of the metal carbonyl or its decomposition products. Of the metal carbonyls I have employed, nickel carbonyl is apparently the best adapted to be employed in preparation of light colored polymeric derivatives of vinylidene chloride.

The catalytic effectiveness of mixtures of oxygenating agents and metal carbonyls is materially decreased when the monomeric mixture to be polymerized contains material such as hexachlorodiphenyloxide as a plasticizer for the polymeric product. It is preferable, therefore, to carry out the polymerization in the absence of such plasticizers when the new catalyst mixtures are employed.

The metal carbonyls are generally unstable in the presence of light so that the composite catalysts cannot be prepared in bright sunlight or even in a brightly lighted laboratory, and are best prepared in a dark room under an infra-red lamp. It is not necessary, however, to carry out the polymerization of the vinylidene halides in the dark.

It is to be understood that the catalyst need not be mixed prior to incorporating the same in the vinylidene halide to be polymerized. For example, a vinylidene halide may be maintained in monomeric form by mixing therewith a suitable amount of a metal carbonyl which inhibits polymerization. When a peroxide is added to such composition, polymerization occurs as herein described.

Other modes of applying the principle of my invention may be employed instead of those explained, change being made as regards the materials herein disclosed, provided the ingredients stated by any of the following claims or the equivalent of such stated ingredients be employed.

I therefore particularly point out and distinctly claim as my invention:

1. A catalyst for the polymerization of vinylidene halides which comprises an organic peroxide and a metal carbonyl.

2. A catalyst for the polymerization of vinylidene halides and of mixtures thereof with polymerizable vinyl compounds which comprises an organic peroxide and a carbonyl of a metal from Group VIII of the periodic table.

3. A catalyst for the polymerization of vinylidene halides and of mixtures thereof with polymerizable vinyl compounds which comprises benzoyl peroxide and nickel carbonyl.

4. The process for the polymerization of a vinylidene halide which comprises adding thereto a metal carbonyl and an organic peroxide.

5. The process for the polymerization of a vinylidene halide which comprises adding thereto a carbonyl of a metal from Group VIII of the periodic table, and an organic peroxide.

6. The process for the polymerization of a vinylidene halide which comprises adding thereto nickel carbonyl and benzoyl peroxide.

7. In a process for polymerizing a vinylidene halide which has been kept in monomeric form by means of a metal carbonyl, the step which consists in adding to the vinylidene halide—metal carbonyl mixture a sufficient amount of an organic peroxide to catalyse polymerization of said monomer at a more rapid rate and to a greater extent than would the addition of the same amount of the peroxide in the absence of the metal carbonyl.

RALPH M. WILEY.